(12) United States Patent
Mizutani et al.

(10) Patent No.: US 9,978,541 B2
(45) Date of Patent: May 22, 2018

(54) ELECTRIC TOOL (71) Applicant: MAKITA CORPORATION, Anjo-shi, Aichi (JP)

(72) Inventors: Akira Mizutani, Anjo (JP); Takahiro Kawakami, Anjo (JP); Shoichi Ishikawa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 532 days.

(21) Appl. No.: 14/634,214

(22) Filed: Feb. 27, 2015

(65) Prior Publication Data
US 2015/0280532 A1    Oct. 1, 2015

(30) Foreign Application Priority Data

Apr. 1, 2014   (JP) ................................ 2014-075559

(51) Int. Cl.
| B25F 5/02 | (2006.01) |
| H01H 9/20 | (2006.01) |
| H02K 7/14 | (2006.01) |
| B25F 5/00 | (2006.01) |
| H02K 11/28 | (2016.01) |

(52) U.S. Cl.
CPC .................. *H01H 9/20* (2013.01); *B25F 5/00* (2013.01); *H02K 7/14* (2013.01); *H02K 11/28* (2016.01); *H01H 2231/048* (2013.01); *H01H 2300/024* (2013.01)

(58) Field of Classification Search
CPC ................ B25F 5/02; H01H 2231/048; H01H 2300/024; H02K 7/145
See application file for complete search history.

(56) References Cited

U.S. PATENT DOCUMENTS

| 6,120,362 A * | 9/2000 | Etter ..................... B24B 23/028 |
| | | 451/354 |
| 8,198,560 B2 * | 6/2012 | Kimata .................... H01H 3/20 |
| | | 200/318.1 |

(Continued)

FOREIGN PATENT DOCUMENTS

| EP | 1 724 057 A2 | 11/2006 |
| EP | 2 540 153 A1 | 1/2013 |

(Continued)

OTHER PUBLICATIONS

May 19, 2017 Office Action issued in Japanese Patent Application No. 2016-151457.

(Continued)

*Primary Examiner* — Andrew M Tecco
(74) *Attorney, Agent, or Firm* — Oliff PLC (57) ABSTRACT

A rechargeable grinder includes a brushless motor, a main body housing configured to accommodate the brushless motor, a main switch and a micro switch configured to distribute power to the brushless motor, and a switch lever capable of moving with respect to the main switch and the micro switch, wherein a lock off lever capable of operating the micro switch in association with movement of the switch lever toward a switch is provided so as to be movable between a lock release position in which the micro switch can be operated and a lock position in which the micro switch cannot be operated.

16 Claims, 9 Drawing Sheets

(56) References Cited

U.S. PATENT DOCUMENTS

| | | | | |
|---|---|---|---|---|
| 8,292,700 | B2* | 10/2012 | Gallagher | B24B 23/022 310/62 |
| 8,716,908 | B2* | 5/2014 | Takeda | B24B 23/02 310/47 |
| 8,827,004 | B2* | 9/2014 | Hosokawa | B25F 5/02 173/170 |
| 9,259,832 | B2* | 2/2016 | Miyazawa | B23D 51/00 |
| 9,278,426 | B2* | 3/2016 | Numata | B24B 55/00 |
| 2005/0196273 | A1* | 9/2005 | Nishikawa | B25F 5/008 415/206 |
| 2010/0009608 | A1 | 1/2010 | Lo et al. | |
| 2011/0227429 | A1* | 9/2011 | Takeda | B24B 23/02 310/50 |
| 2012/0048585 | A1* | 3/2012 | Miyazawa | B23D 51/00 173/170 |
| 2012/0077424 | A1* | 3/2012 | Gallagher | B24B 23/022 451/344 |
| 2012/0317821 | A1* | 12/2012 | Tsuchiya | A01G 3/053 30/196 |
| 2013/0023189 | A1* | 1/2013 | Numata | B24B 55/00 451/344 |

FOREIGN PATENT DOCUMENTS

| | | |
|---|---|---|
| EP | 2 548 698 A2 | 1/2013 |
| JP | H06-198573 A | 7/1994 |
| JP | H10-269409 A | 10/1998 |
| JP | 2006-281414 A | 10/2006 |
| JP | 2010-269409 A | 12/2010 |
| JP | 2011-143492 A | 7/2011 |
| JP | 2011-177812 A | 9/2011 |
| JP | 2013-022702 A | 2/2013 |
| JP | 2013-175482 A | 9/2013 |

OTHER PUBLICATIONS

Nov. 9, 2015 Extended Search Report in European Patent Application No. 15157655.0.

Sep. 19, 2017 Office Action issued in Japanese Patent Application No. 2016-151457.

Jul. 11, 2017 Office Action issued in Japanese Patent Application No. 2014-075559.

Apr. 3, 2018 Office Action issued in Japanese Patent Application No. 2016-151457.

Hitachi Koki Co., Ltd., "Hitachi Kouki 18V super lithium series," Sep. 2009.

* cited by examiner

ELECTRIC TOOL

BACKGROUND OF THE INVENTION

This application claims the benefit of Japanese Patent Application Number 2014-075559 filed on Apr. 1, 2014, the entirety of which is incorporated by reference.

FIELD OF THE INVENTION

The present invention relates to an electric tool such as a rechargeable grinder configured to be switched ON by an operation of an operating member.

DESCRIPTION OF THE RELATED ART

In an electric tool such as a rechargeable grinder or the like, a switch accommodated in a housing is turned ON by a push-in operation of an operating member such as a lever provided on the housing to drive a motor, as disclosed in JP 2013-22702-A. In this case, the operating member is provided with a lock-off member configured to prevent the operating member from being pushed in by coming into abutment with the housing and maintain the switch in an OFF state so as to avoid the operating member from being accidentally pushed in. When an operator uses the tool, the operating member is pushed in after the lock-off member has been moved to a position at which the lock-off member does not interfere with the housing.

However, in the case where the operating member is formed to be elongated along the housing, even though the lock-off member is provided, the operating member may be deflected by an external force, and may turn the switch ON. Therefore, deflection needs to be prevented by adding a reinforcing member to the operating member.

Accordingly, it is an object of the invention to provide an electric tool in which a probability of an erroneous operation due to deflection or the like of the operating member is eliminated.

In order to achieve the object, a first aspect of the invention provides an electric tool including a motor a housing configured to accommodate the motor a switch configured to distribute power to the motor, and an operating member configured to be movable with respect to the switch. The operating member is provided with a switch operating portion capable of operating the switch in association with a movement of the operating member toward the switch so as to be movable between a position where the switch can be operated and a position where the switch cannot be operated.

Preferably, the switch operating portion is a lock-off member located in a lock position where the movement of the operating member is restricted in a normal state, and is movable to a lock release position where the restriction of movement of the operating member is released. The lock position corresponds to a position where the switch cannot be operated and the lock release position corresponds to a position where the switch can be operated.

In order to achieve the above-described object, a second aspect of the present invention provides an electric tool including a motor, a housing configured to accommodate the motor, a switch configured to distribute power to the motor, and an operating member pivotable about a pivotal movement supporting point coupled to the housing, and a lock-off member provided so as to be movable toward the operating member. The switch is arranged between the pivotal movement supporting point and the lock-off member.

In order to achieve the object described above, a third aspect of the present invention described above includes a housing configured to accommodate the motor, two switches accommodated in the housing and configured to distribute power to the motor, and an operating member capable of operating the two switches.

Preferably, the operating member includes a lock-off member located at a lock position to restrict the movement of the operating member in a normal state and being movable to the lock release position to release the restriction of movement of the operating member. The operating member is capable of operating one of the switches and the lock-off member is capable of operating the other switch when the operating member is in a lock releasing position.

According to the above mentioned invention, the switch is not turned ON unless the switch operating portion is moved to the position where the switch can be operated. Further, the switch is prevented from being turned ON by the operating member with the switch arranged between the pivotal movement supporting point of the operating member and the lock-off member. Since power is not distributed to the motor unless the two switches are turned ON by the operating member, a probability of an erroneous action caused by deflection or the like of the operating member may be eliminated without providing a reinforcing member.

BRIEF DESCRIPTION OF DRAWINGS

FIG. 8 is a vertical cross-sectional view of the rechargeable grinder in a state in which the main switch is turned ON.

FIG. 9 is a vertical cross-sectional view of the rechargeable grinder in a state in which the micro switch is turned ON.

DETAIL DESCRIPTION OF INVENTION

Embodiments of the invention will be described with reference to the drawings.

Figure 1:
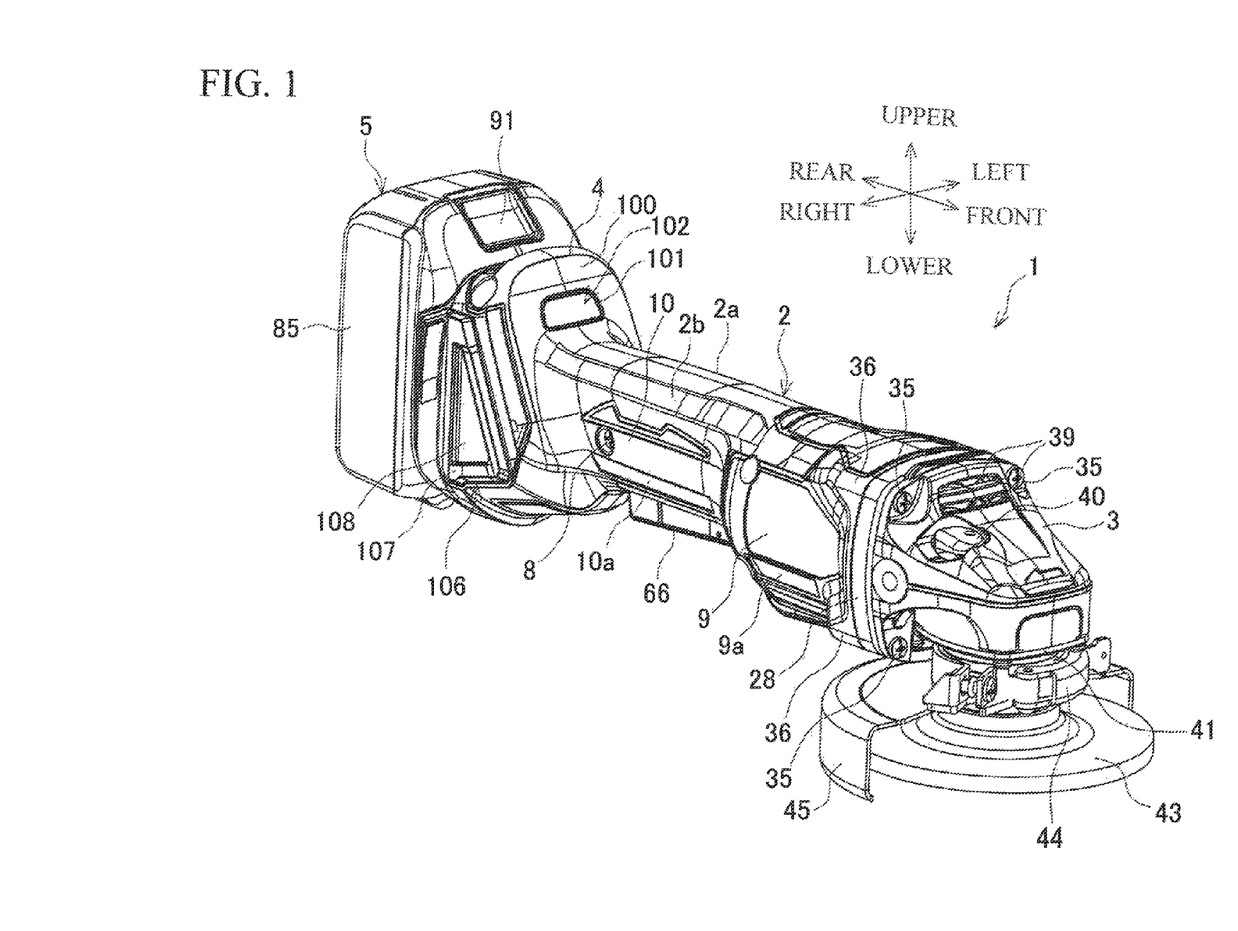
FIG. 1 is a perspective view of a rechargeable grinder.
Figure 2:
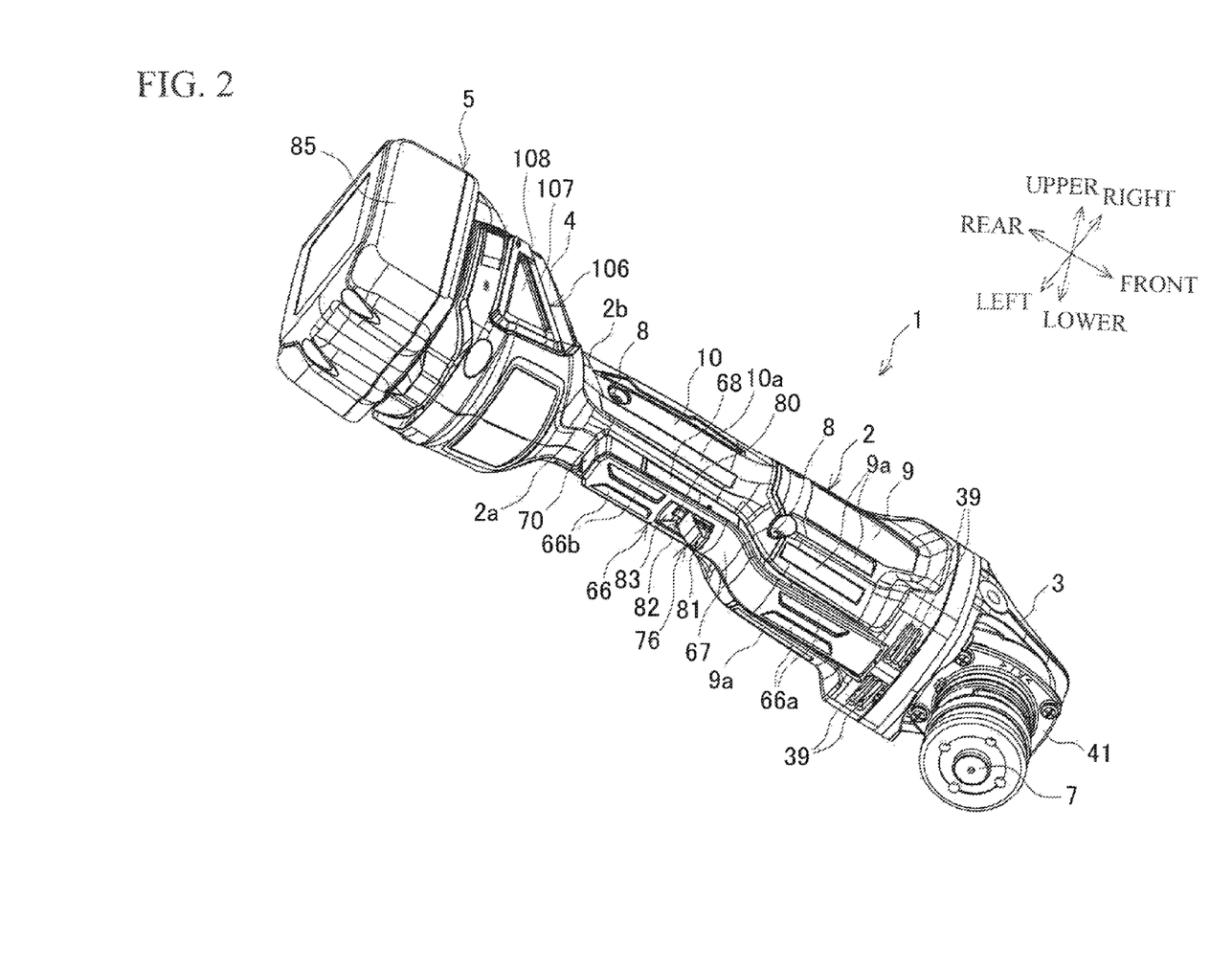
FIG. 2 is a perspective view of the rechargeable grinder viewed from below.
Figure 3:
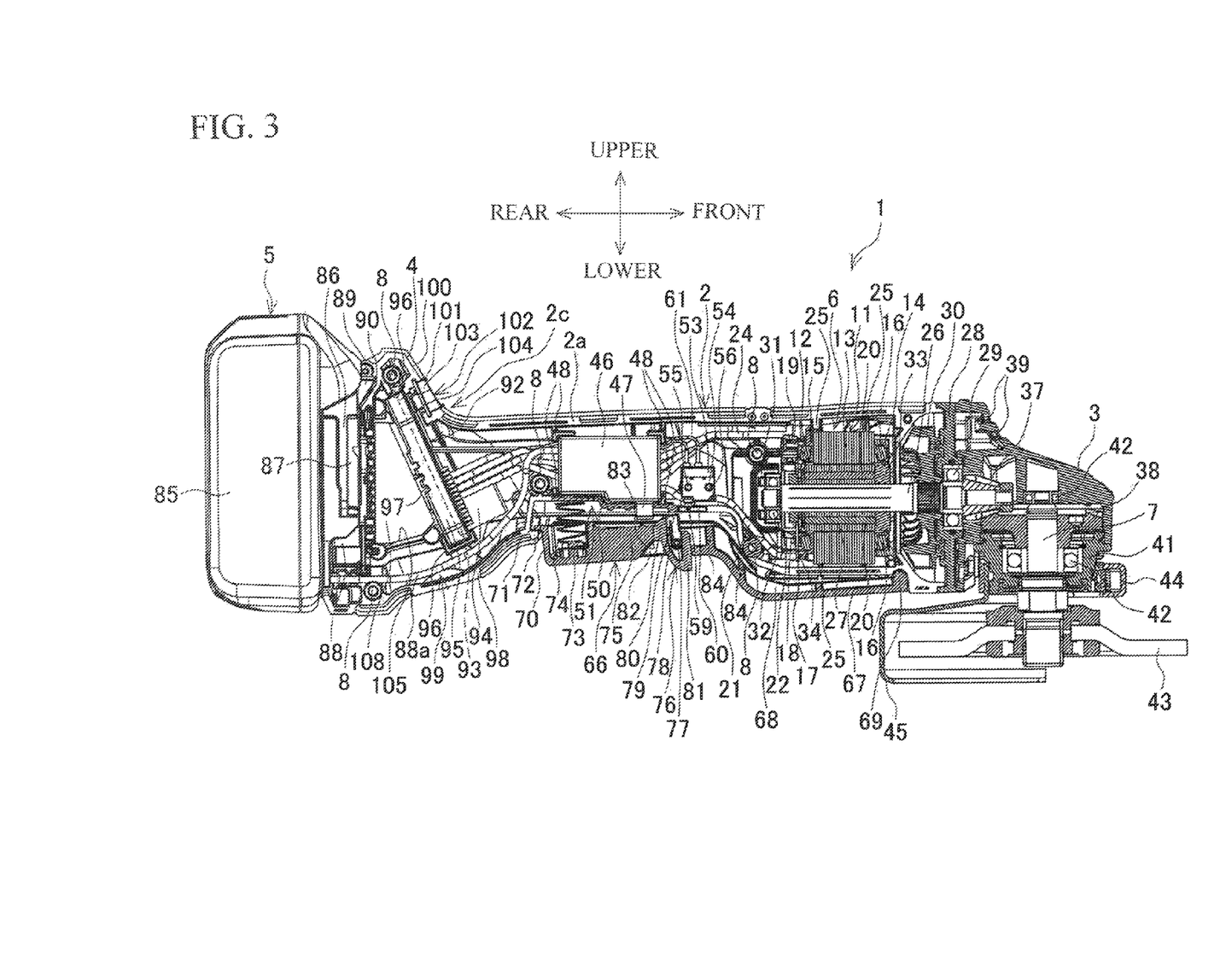
FIG. 3 is a vertical cross-sectional view of the rechargeable grinder (lock-off state).

FIGS. 1 and 2 are perspective views of a rechargeable grinder as an example of an electric tool, and FIG. 3 is a vertical cross-sectional view of the rechargeable grinder. A rechargeable grinder (hereinafter referred to simply as a "grinder") 1 includes a cylindrical main body housing 2, a brushless motor 6 accommodated in the main body housing 2, a gear housing 3 coupled to the front of the main body housing 2, a spindle 7 projecting downward from the gear housing 3, a battery mounting portion 4 formed at a rear end of the main body housing 2, and a battery pack 5 configured to serve as a power source mounted on the battery mounting portion 4. The main body housing 2 is formed by assembling a pair of left and right half housing 2a and 2b with screws 8 and 8, and a storage portion of the brushless motor 6 corresponds to a thickest cylindrical portion 9. A portion rearward of the cylindrical portion 9 is a thin tube portion 10 thinner than the cylindrical portion 9 and configured to accommodate two switches described later. The thin tube portion 10 is used as a grip having a length enough to place four fingers of the operator and used as a grip to be gripped at the time of usage. In other words, the grip having a small diameter is formed so as to be easily gripped at a position rearward of the brushless motor 6. Side surfaces of the cylindrical portion 9 and the thin tube portion 10 are provided with a pair of left and right slip-proof recesses 9a and 10a elongated in the fore-and-aft direction respectively to achieve an easy-to-catch configuration when the main body housing 2 is gripped. Such slip-proof recesses are also provided on a lower surface of a switch lever 66 in the front and rear thereof as a pair of left and right slip-proof recesses 66a, 66a, 66b, and 66b, described later. The front-side slip-proof recess 66a is located on the cylindrical portion 9 on the same cross section (the same circumference) as the slip-proof recess 9a, and the rear-side slip-proof recess 66b is located on the thin tube portion 10 on the same cross section as the slip-proof recess 10a, respectively.

The brushless motor 6 is an inner rotor type motor including a stator 11 and a rotor 12 located inside the stator 11. The stator 11 includes cylindrical stator cores 13 formed of a plurality of laminated copper plates, a front insulator 14 and a rear insulator 15 provided respectively on the end surface of the stator core 13 in the front and the rear in the axial direction, and six coils 16, 16 wound around the stator core 13 via the front and rear insulators 14 and 15. The rear insulator 15 is provided with a sensor circuit substrate 17 and a short circuit member 18 mounted thereto.

Figure 4:
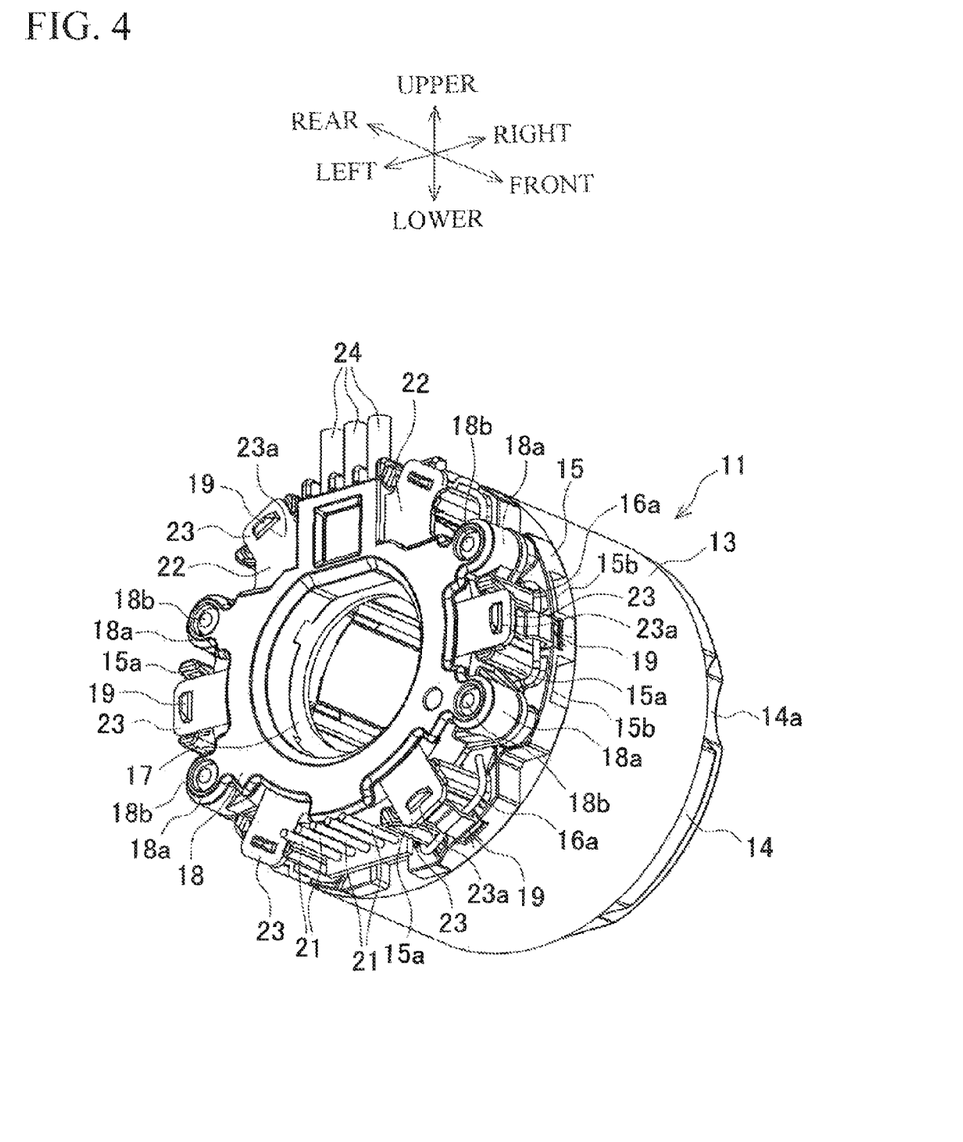
FIG. 4 is a perspective view of a stator viewed from lower rear side.

The rear insulator 15 is a ring-shaped mold having the same diameter as, and integrally formed with the stator core 13. Fusing terminals 19, 19 are retained by six retaining portions 15a, 15a projecting from the rear surface of the rear insulator 15 equidistantly and concentrically as illustrated in FIG. 4. The coils 16 are formed by one winding wire which is wound around respective teeth of the stator core 13 in sequence, and respective winding wires 16a connecting the coils 16 and 16 are interposed between the fusing terminals 19. Accordingly, the coils 16 are electrically connected to the fusing terminals 19. A pair of positioning recesses 15b and 15b are formed on left and right side surfaces of the rear insulator 15.

The sensor circuit substrate 17 includes three rotation detection elements (not illustrated) configured to detect a position of a permanent magnet 20 provided on the rotor 12 and output a rotation detection signal mounted thereon. The sensor circuit substrate 17 is formed into a doughnut shape having an outer diameter small enough to be accommodated in the retaining portions 15a. Signal lines 21 of the rotation detection elements are drawn out from a lower portion of the sensor circuit substrate 17.

The short circuit member 18 is formed of a resin having a ring shape of the substantially same diameter as that of the sensor circuit substrate 17. Four bosses 18a, 18a, are provided integrally with screw bosses, not illustrated, so as to project from an outer periphery of the short circuit member 18. The screw bosses are formed on the rear insulator 15 and allows fitting of the four bosses 18a, 18a from the front. The short circuit member 18 is formed by insert molding in a state in which arcuate-shaped three sheet metal members 22, 22 are overlapped on concentric circles so as not in contact with each other. The arcuate-shaped three sheet metal members 22, 22 are provided with a pair of short circuit strips 23, 23 projecting on a diagonal line. The short circuit strips 23 project radially from the short circuit member 18 corresponding to the respective fusing terminals 19, and are provided with slits 23a to allow insertion of the fusing terminals 19 at distal ends thereof. Power source lines 24, 24 for supplying power source to a U-phase, a V-phase, and a W-phase are welded to the sheet metal members 22 respectively, and are drawn out from an upper portion of the short circuit member 18.

The short circuit member 18 is fixed by screws 18b so as to overlap from behind the sensor circuit substrate 17 in such a manner that the screw bosses of the rear insulator 15 are inserted into the bosses 18a. Accordingly, distal ends of the respective fusing terminals 19 are inserted into the corresponding short circuit strips 23. In this state, if the fusing terminals 19 and the short circuit strips 23 are soldered, the fusing terminals 19 located point symmetry are short-circuited by the sheet metal member 22 respectively. In other words, the winding wire 16a arranged between the coils 16 and 16 is wound on the stator core 13 in sequence, and the fusing terminals 19 are electrically connected to the winding wire 16a. Thus, the fusion terminals 19 are electrically connected diagonally to each other by the three sheet metal members 22, which form, so called a delta connection of parallel winding.

Since the sensor circuit substrate 17 and the short circuit member 18 are small enough to be fit within a heightwise dimension of the fusing terminals 19, the entire length of the brushless motor 6 is minimized even when the short circuit member 18 is used. In addition, as all the members are small enough to be fit within the outer diameter of the stator core 13 except for the signal lines 21 and the power source lines 24, the outer diameter of the product is not increased and a compact profile is achieved. The signal lines 21 are drawn out from the lower portion and the power source lines 24 are drawn out from the upper portion respectively, so that the wiring is achieved easily. It should be noted that the signal lines 21 may be mounted upside down so as to be drawn out from the upper portion, and may be drawn out from the upper portion or the lower portion together with the power source lines 24.

The stator 11 assembled thereto may be retained coaxially with the cylindrical portion 9 by supporting ribs 25, 25 projecting in a circumferential direction to inner surfaces of the half housings 2a and 2b of the main body housing 2. A locking rib, not illustrated, is arranged frontwardly of the supporting rib 25A and configured to be locked by a notch 14a formed on the front insulator 14. Projections, not illustrated, are arranged rearwardly of the supporting rib 25 and configured to fit in the positioning recesses 15b and 15b formed on the rear insulator 15, whereby positioning in the fore-and-aft direction is performed.

The short circuit member 18 and the sensor circuit substrate 17 may be formed integrally, and the coils 16 may be connected by so called a Y-connection. An FET of a circuit board 93, which will be described later, may be provided on the sensor circuit substrate 17.

The rotor 12 includes a rotary shaft 26 located at an axial center, a substantially cylindrical-shaped rotor core 27 arranged in the periphery of the rotary shaft 26 having a plurality of stacked steel plates, and four plate-shaped permanent magnets (sintered magnets) 20 fixed in the interior of the rotor core 27. The permanent magnets 20 are fixed in a through hole with an adhesive agent and/or press-fit. The through hole is formed such that the magnets are located on four sides of a square in which the rotary shaft 26 is centered in lateral cross-sectional view of the rotor core 27.

The rotary shaft 26 is axially supported by a bearing 29 which is retained by a partitioning plate 28 interposed between the main body housing 2 and the gear housing 3. The rotary shaft 26 projects at a distal end thereof into the gear housing 3. A centrifugal fan 30 is mounted on the rotary shaft 26 rearward of the partitioning plate 28. An inner surface of a front end of the main body housing 2 where the centrifugal fan 30 is accommodated is formed into a tapered shape reduced in diameter as it goes rearward, so that an air flow generated from the centrifugal fan 30 in the radial direction can be guided forward. The partitioning plate 28 includes a through hole, not illustrated, through which an air flow from the centrifugal fan 30 can be delivered into the gear housing 3.

A rear end of the rotary shaft 26 is axially supported by a bearing 32. The bearing 32 is retained by receiving plates 31 projecting from the left and right half housings 2a and 2b respectively at a rear end of the cylindrical portion 9.

In addition, in the rotor 12, a front stopper 33 is provided between the rotor core 27 and the centrifugal fan 30. The front stopper 33 is a disk made of brass and having the same outer diameter as that of the rotor core 27. The front stopper 33 is secured to the rotary shaft 26 concentrically with the rotor core 27. In contrast, a rear stopper 34 is provided between the rotor core 27 and the bearing 32 on the rear side. The rear stopper 34 is a disk formed of brass and having a smaller outer diameter than the rotor core 27, and is secured to the rotary shaft 26 concentrically with the rotor core 27. The outer diameter of the rear stopper 34 is larger than an inner circle surrounded by four permanent magnets 20, and the rear stopper 34 is located rearward of the respective permanent magnets 20.

The gear housing 3 is fixed by screwing four screws 35 penetrating therethrough from the front at four corners into screw stoppers 36 which are formed on an outer periphery of a front end of the main body housing 2 via the partitioning plate 28 (FIG. 1). A bevel gear 37 is secured to the front end of the rotary shaft 26 projecting into the gear housing 3, and engages a bevel gear 38 secured to an upper end of the spindle 7. Reference numeral 39 denotes an exhaust port formed on the front surface of the gear housing 3, and reference numeral 40 denotes a shaft lock capable of locking the rotation of the spindle 7 via the bevel gear 38 by a push-in operation. The spindle 7 projecting downward is axially supported by the upper and lower bearings 42 and 42 which are retained by the gear housing 3 and a bearing box 41, respectively. The bearing box 41 is assembled to the lower portion of the gear housing 3. A distal end tool 43 such as a disc-shaped grinder can be mounted to a lower end of the spindle 7. A wheel cover 45 configured to cover a rear half of the distal end tool 43 is mounted on an outer periphery of the bearing box 41 by a belt-shaped clump 44.

Figure 5:
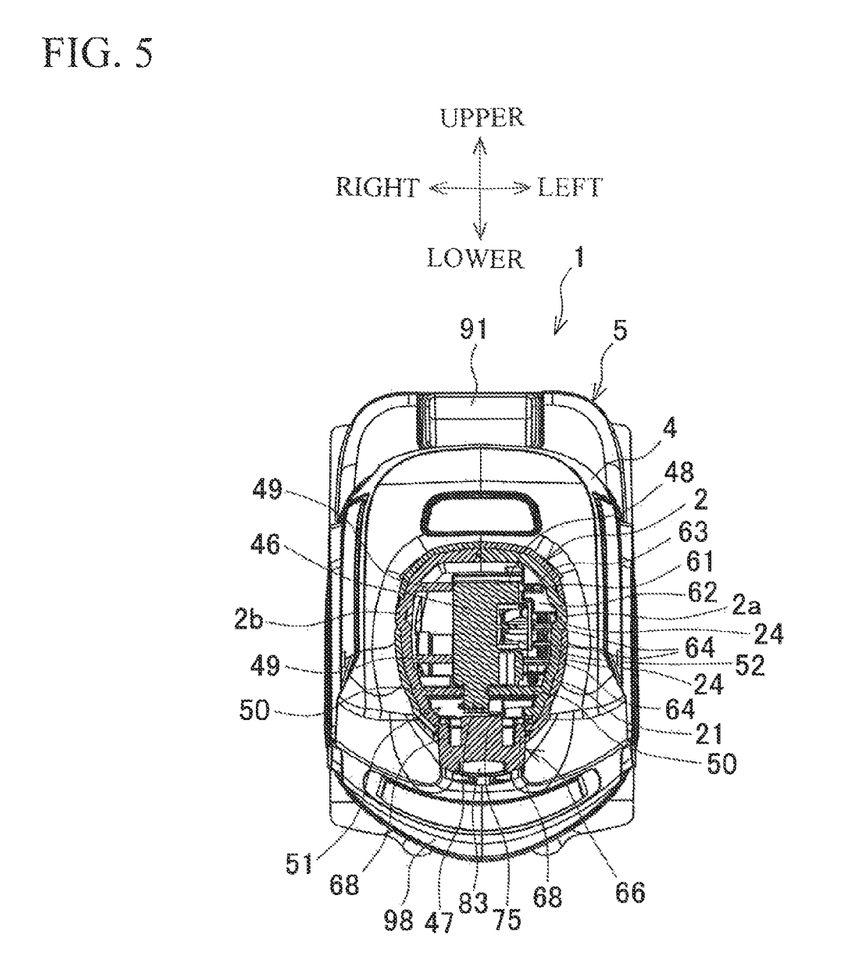
FIG. 5 is a lateral cross-sectional view of a main switch at a plunger portion.

A main switch 46 and a micro switch 53 are accommodated in the main body housing 2 rearward of the brushless motor 6. The main switch 46 is used as a mechanical contact point to conduct electricity from a terminal base 88 described later to the circuit board 93 by the ON operation. The main switch 46 has four corners supported by square ribs 48, 48 projecting from an inner surface of the left half housing 2a, so that movements in the upward-downward direction and the fore-and-aft directions are restricted. As illustrated in FIG. 5, left and right side surfaces are supported by small ribs 64 and a lateral rib 49 projected from the inner surfaces of the left and right half housings 2a and 2b, so that the leftward and rightward movements are restricted. In this state, the main switch 46 is retained in a posture with a plunger 47 projecting and being biased faces downward. Lower surface portions 50 and 50 of the half housings 2a and 2b located on the lower side of the main switch 46 are retracted upward to a position coming into abutment with the lower surfaces of the main switch 46. A recess 51 from which the plunger 47 penetrating through the lower surface portion 50 projects is formed on a lower surface of the main body housing 2. A terminal portion 52 to be connected to the terminal base 88 and the circuit board 93 is provided on a left side surface of the main switch 46.

Figure 6:
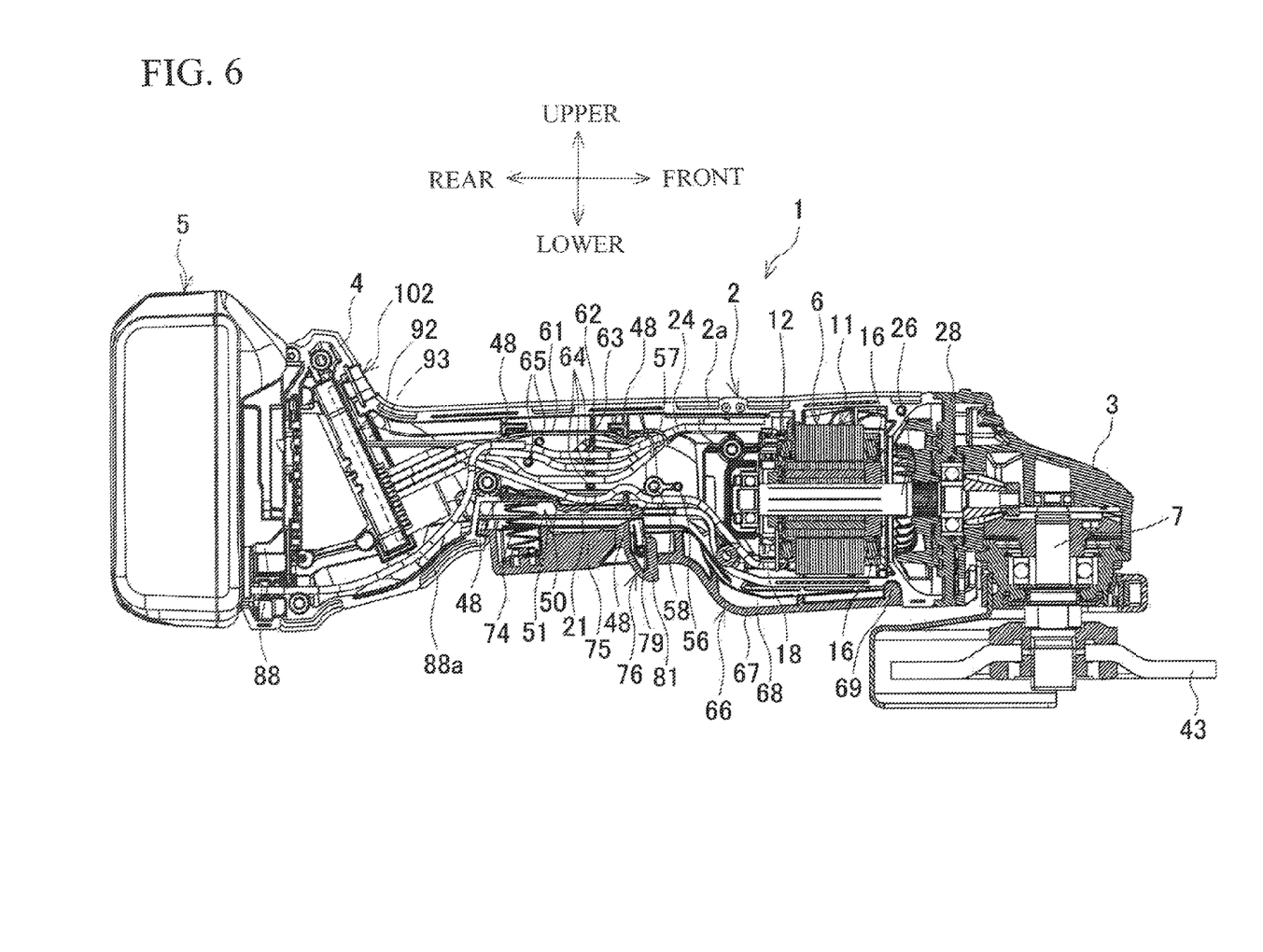
FIG. 6 is a vertical cross-sectional view of the rechargeable grinder in which the main switch and a micro switch are omitted.

The micro switch 53 includes a mounting through hole 54 and a mounting projection 55 at an electrical contact for conducting electricity from the circuit board 93 to the brushless motor 6 by the ON operation. The micro switch 53 is retained in a position in which a pin 56 projecting from the inner surface of the left half housing 2a is penetrated through the through hole 54 at a position forward of the main switch 46, and the mounting projection 55 is inserted through a mounting hole 58 (FIG. 6) provided in a boss 57 projecting from the inner surface of the half housing 2a. Accordingly, a posture of the micro switch 53 is retained in a position with a button portion 59 oriented downward. The lower surface portions 50 and 50 of the respective half housings are provided with through holes 60 which are configured to make the button portion 59 faced into the recess 51. Lead wires 61 and 61 of the micro switch 53 are laid to the circuit board 93 through a slit 63 provided on a vertical rib 62, as illustrated in FIG. 6. The vertical rib 62 is provided in the vertical direction on the inner surface of the half housing 2a between the square ribs 48 and 48. The vertical rib 62 abuts against the terminal portion 52 of the main switch 46 as well.

On the left side of the main switch 46 in the thin tube portion 10, a wiring space for the signal line 21, the power source lines 24, and the lead wire 61 are provided. The small ribs 64 formed on the inner surface of the half housing 2a are arranged downward of the vertical rib 62 equidistantly so as to partition the respective wiring lines. Small bosses 65 and 65 are provided rearward of the small ribs 64 so as to project for fixing the wiring lines to the inner surface of the half housing 2a. The lead wire 61 may be passed on the upper side of the main switch 46.

The switch lever 66 serving as the operating member is provided on a lower surface of the main body housing 2. The switch lever 66 includes a bottom plate portion 67 having a width which can fit the recess 51 and a pair of side plate portions 68 and 68 provided at both right and left ends of the bottom plate portion 67. The switch lever 66 is an angular C shape which extends in the fore-and-aft direction while being bent along the shape of the lower surface from the recess 51 to the cylindrical portion 9 in lateral cross section extending. Further, the switch lever 66 is formed such that the height of the side plate portions 68 and 68 increases as it goes rearward. The switch lever 66 is coupled so as to be pivotable upward and downward about a supporting point 69 which corresponds to the pivotal movement supporting point. The supporting pin 69 facing upward and provided at a front end of the bottom plate portion 67 is retained from the left and the right with pins, not illustrated, provided on the half housings 2a and 2b. A locking strip 71 projecting rearward is provided at an upper end of a closed portion 70. The closed portion 70 is provided at a rear end of the switch lever 66 so as to be capable of being locked by a stopper portion 72 which is provided so as to project forward at an edge of an opening at the rear end of the recess 51.

The switch lever 66 is pivotable between a projecting position where the locking strip 71 is locked by the stopper portion 72 and a push-in position where the locking strip 71 enters into the recess 51. However, in the normal state, the switch lever 66 is retained at the projecting position by a spring receiving portion 73 provided on the bottom plate portion 67 at the rear portion of the switch lever 66 and due to biasing of a coil spring 74 provided between the switch lever 66 and the bottom surface of the recess 51. A press plate 75 is provided on the bottom plate portion 67 forward of the spring receiving portion 73. The press plate 75 is at a position downward of the plunger 47 of the main switch 46 when in the projecting position, so that the press plate 75 pushes the plunger 47 inward by the movement of the switch lever 66 to the push-in position, thereby turning the main switch 46 ON.

A lock off lever 76 serving as a switch operating portion (lock-off member) is provided forwardly of the press plate 75. The lock off lever 76 is rotatably supported at a center portion thereof by a supporting pin 77 which is provided between the side plate portions 68 and 68 of the switch lever 66 and extends leftward and rightward. In the normal state, the lock off lever 76 is biased counterclockwise in FIG. 3 by a torsion spring 78. The torsion spring 78 is wound around the supporting pin 77 and locked at one end by the switch lever 66 and at the other end by the lock off lever 76, respectively. With this rotational biasing, a projection 80 projecting from a locking portion 79 of the lock off lever 76 on one end side comes into abutment with a front surface of the press plate 75. Accordingly, the lock portion 79 comes into proximity to the bottom surface of the recess 51 rearward (the inner side of a through hole 82 described later) of the through hole 60, so that the lock off lever 76 is retained at a vertical posture (lock position) in which an operating portion 81 at the other end side projects downward through the through hole 82 provided in the bottom plate portion 67 of the switch lever 66. An slope 83 retracting as it goes downward is formed on the lower side of the front surface of the press plate 75, and a rear surface of the operating portion 81 positioned on the front thereof is formed into a curved surface proceeding forward as it goes downward. Reference signs 84, 84 denote a coupling rib formed on the bottom plate portion 67 forward of the lock off lever 76 and configured to couple the side plate portions 68 and 68.

In this manner, with the lock off lever 76 at the vertical posture, even when the switch lever 66 is pushed in, the locking portion 79 comes into abutment with the bottom surface of the recess 51 and hence the switch lever 66 is restricted from being pushed in, so that the press plate 75 does not come into abutment with the plunger 47 of the main switch 46. In contrast, when the operating portion 81 projecting from the switch lever 66 is retracted to rotate the lock off lever 76 clockwise in FIG. 3 against a biasing force of the torsion spring 78, the lock off lever 76 takes a lateral posture (lock release position). In the lateral posture, the locking portion 79 comes into abutment with an upper surface of the bottom plate portion 67, and the operating portion 81 comes into abutment with the slope 83 and moves away from the bottom surface of the recess 51, whereby the switch lever 66 is allowed to be pushed in. In this state, since the projection 80 of the locking portion 79 is located downward of the button portion 59 of the micro switch 53, the projection 80 is allowed to press the button portion 59 if the press-in operation of the switch lever 66 is continued. However, the button portion 59 is located on the upper side of the push-in position of the plunger 47, so that the push-in operation of the switch lever 66 allows the main switch 46 to be turned ON prior to the button portion 59 is pushed. By the ON operation of the main switch 46, power supply to a microcomputer, described later, is started, and a display unit 102, described later, is allowed to light.

The battery pack 5 includes a coupling portion 86 provided with a terminal, not illustrated on an upper portion of an outer case 85 which accommodates a plurality of cells. A pair of rail portions 87 and 87 is provided so as to project on both sides of the coupling portion 86. The battery mounting portion 4 includes an opening which receives the coupling portion 86 of the battery pack 5 from above. The opening has both sides in which a pair of left and right guide rails (not illustrated) is configured to fit in the rail portion of the coupling portion 86 so as to project from the opening. The terminal base 88 having a terminal plate corresponding to a terminal of the coupling portion 86 is provided between the guide rails so as to face upward. Therefore, when the battery pack 5 is slid from above by fitting the rail portions 87 and 87 to guide rails from above the battery mounting portion 4 in a vertical posture with the coupling portion 86 faced forward, the terminal of the coupling portion 86 and the terminal plate of the terminal base 88 are electrically connected. Reference numeral 89 denotes an engaging claw provided on the battery pack 5, which is configured to engage a locking recess 90 provided on the battery mounting portion 4 in a mounted state to prevent the battery pack 5 from coming apart. The battery pack 5 may be removed by retracting the engaging claw 89 to the rear side in the outer case 85 by an operation of a release button 91.

In the battery mounting portion 4, a controller 92 is accommodated at a position forward of the terminal base 88. The controller 92 includes a circuit board 93 which is accommodated in an aluminum dish-shaped case 95 and on which six FETs (not illustrated) corresponding to the respective coils 16 of the brushless motor 6, a capacitor 94 and a microcomputer (not illustrated) are mounted. The controller 92 is retained by the retaining portions 96 and 96 provided above and below on the inner surfaces of the half housings 2a and 2b. Here, the lower retaining portion 96 is located forward of the upper side thereof, so that the controller 92 is supported in an inclined posture in which the lower end is positioned forward of the upper end with respect to an axial line of the main body housing 2. At a center of the back surface of the case 95, a grid-shaped groove 97 is formed.

By the inclination of the controller 92, even when the capacitor 94 is provided at an end portion of the circuit board 93, the capacitor 94 may be positioned on the center side in the main body housing 2, so that necessity of providing a protruding shape in the main body housing 2 is eliminated. Since the distance between the aluminum case 95 and the terminal base 88 is increased by the inclination of the controller 92, likelihood of conduction therebetween is significantly reduced. The capacitor 94 may be provided at a position away from the circuit board 93 by increasing an electrode terminal. In this case, the capacitor 94 may be formed at a position forward of the circuit board 93 and between the circuit board 93 and the main switch 46, or rearward of the circuit board 93 and between the circuit board 93 and the battery pack 5, so that a compact profile is achieved.

The lower portion of the battery mounting portion 4 is a swelled portion 98 swelling downward with respect to a square tube portion 10 to form a space 99 for communicating the front and the rear of the controller 92 between the controller 92 and the swelled portion 98 and wiring a power source line 88a from the terminal base 88.

A plurality of LEDs, which is not illustrated, are mounted on an upper end side of the circuit board 93 so as to face a window 101 provided in an inclined portion 100 formed in substantially the same direction as an inclination of the controller 92 on an upper side of the battery mounting portion 4. In the window 101, shielding plates 103 which is configured to partition between the LEDs and a display plate 104 which is configured to cover the surfaces of the shielding plates 103 are provided to form the display unit 102 for indicating a remaining amount of battery so as to be visible from the outside. Here, since the display unit 102 extends in the upward and downward direction and the fore-and-aft direction, visibility of the display unit 102 is improved (FIG. 3). Therefore, the housing may be formed in a compact profile without interference between the power source line 88a and the display unit 102. Since the display unit 102 is located within a recess portion 2c (FIG. 3) which is formed on an upper side of the root of the main body housing 2 by the battery mounting portion 4 projecting upward, contact between the display unit 102 and other members may be reduced.

In contrast, air intake ports 105 and 105 are formed between the terminal base 88 and the controller 92 on left and right side surfaces of the battery mounting portion 4. The air intake port 105 is formed into a triangular shape elongated forward as it goes downward so as to match the shape of the space formed between the terminal base 88 and the inclined controller 92.

As illustrated in FIGS. 1 and 2, reference numeral 106 denotes air intake port covers to be mounted on side surfaces of the battery mounting portion 4 at positions of the air intake ports 105 and 105. The air intake port covers 106 are each formed by providing a wirework 108 in a triangular rubber-made frame 107, which is slightly larger than the air intake ports 105. The air intake port covers 106 is attached in a state of covering the air intake port 105 with the wirework 108 by inserting engaging pins, not illustrated, projecting on the back surface of the frame 107 at apexes into locking holes, not illustrated, provided on the side surface of the battery mounting portion 4. With the air intake port cover 106, air ventilation to the air intake port 105 is allowed, and entry of foreign substances is prevented.

In the grinder 1 configured as described above, the switch lever 66 biased to the projecting position by the coil spring 74 as illustrated in FIG. 6 is in the lock-off state in which the switch lever 66 is restricted from being pushed in by the lock off lever 76 which is located in the lock position in the normal state. Therefore, even though the switch lever 66 is pressed accidentally with a hand which grips the thin tube portion 10, the switch lever 66 is prevented from being pushed in.

Figure 7:
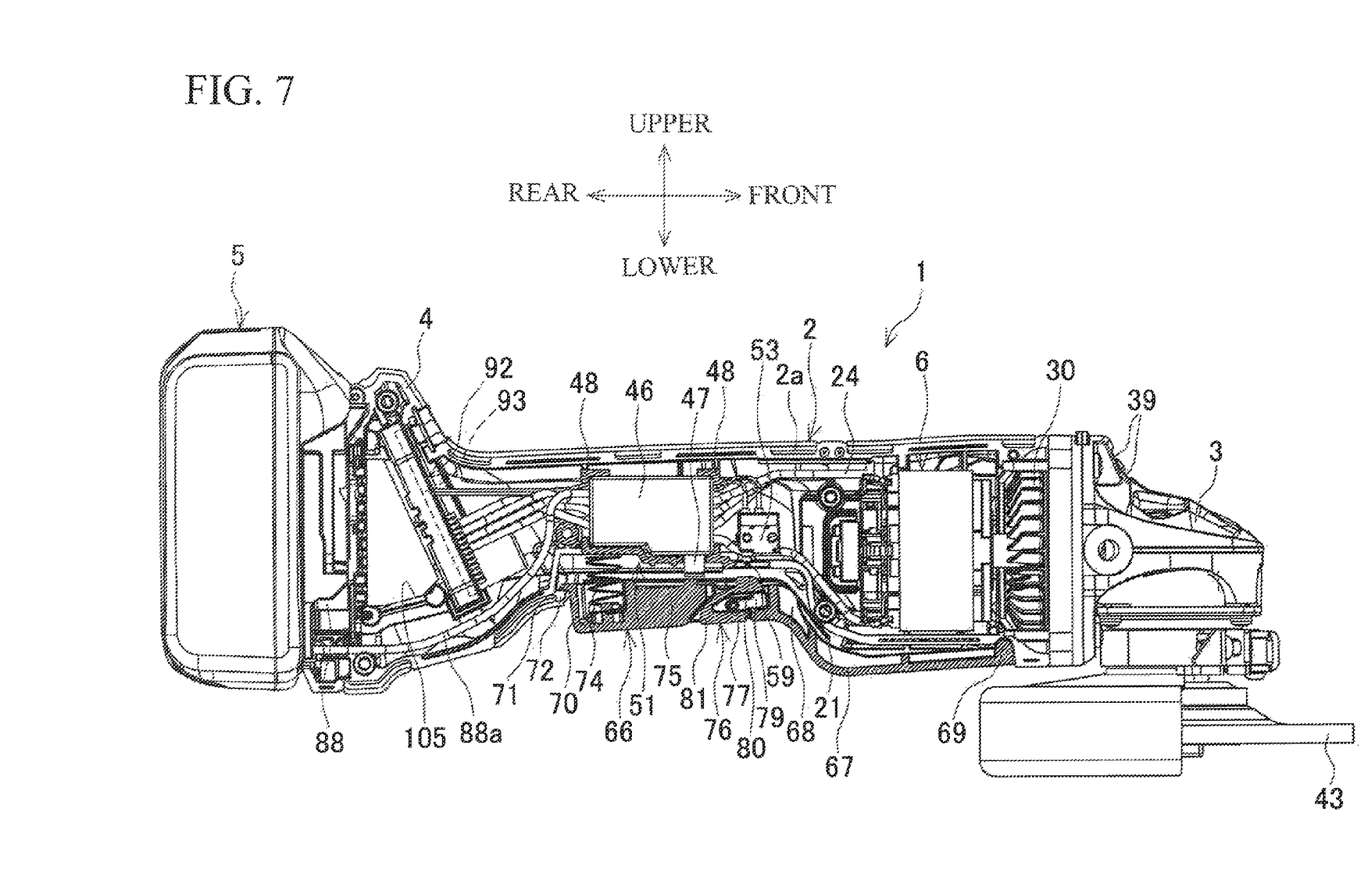
FIG. 7 is a vertical cross-sectional view of the rechargeable grinder in a state in which the lock-off is released.

When using the grinder 1, the operating portion 81 of the lock off lever 76 is refracted to allow the lock off lever 76 to rotate by a finger, the locking portion 79 refracts forward and takes a lateral posture as illustrated in FIG. 7. Therefore, the switch lever 66 is allowed to be pushed in. At this time, since the rear surface of the operating portion 81 is a curved surface, there is no risk of pinching the finger between the operating portion 81 and the switch lever 66.

Figure 8:
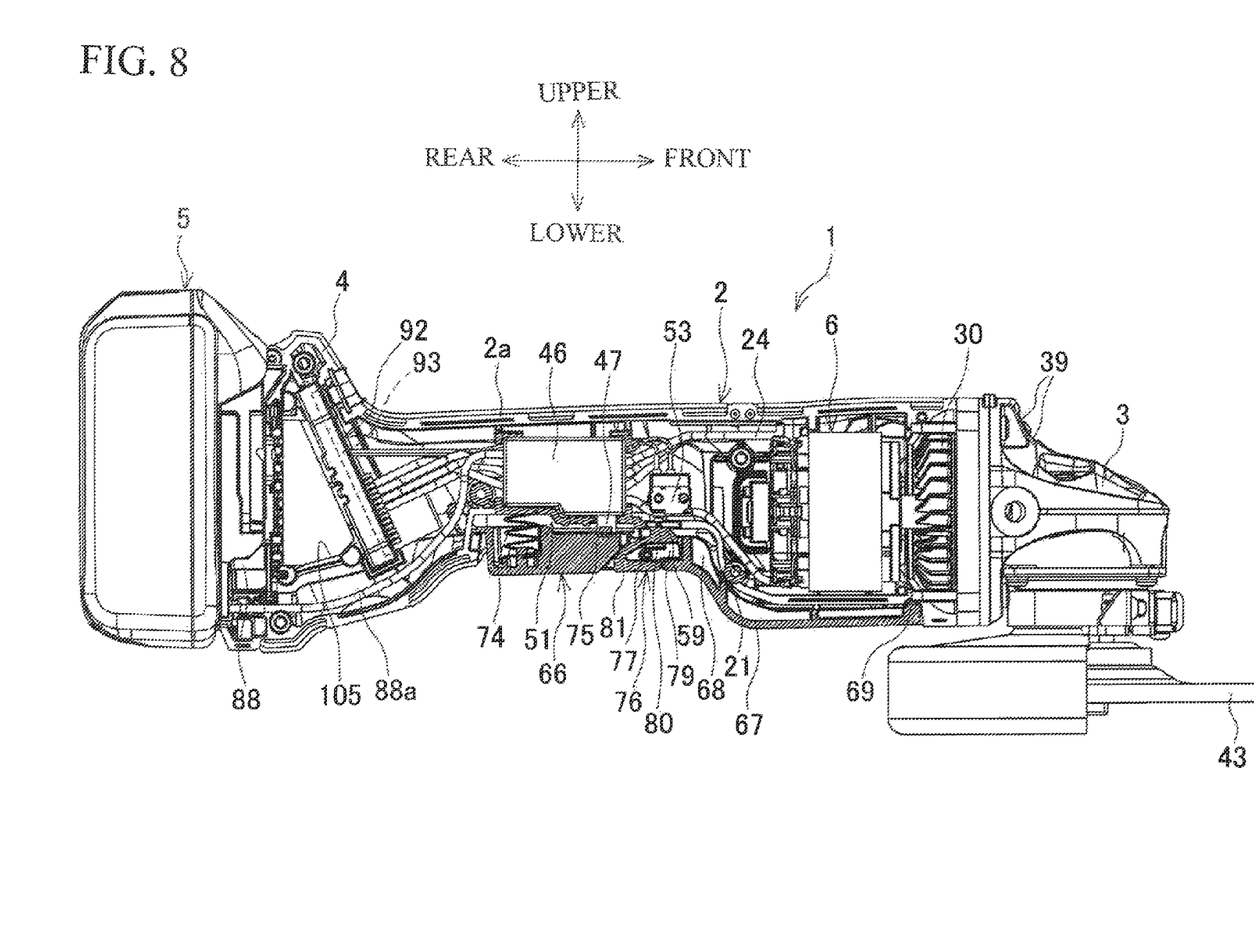

Therefore, as illustrated in FIG. 8, the press plate 75 pushes the plunger 47 inward to turn the main switch 46 ON, whereby the power source from the battery pack 5 is supplied to the circuit board 93 of the controller 92. In this state, the projection 80 of the locking portion 79 of the lock off lever 76 does not press the button portion 59 of the micro switch 53.

Figure 9:
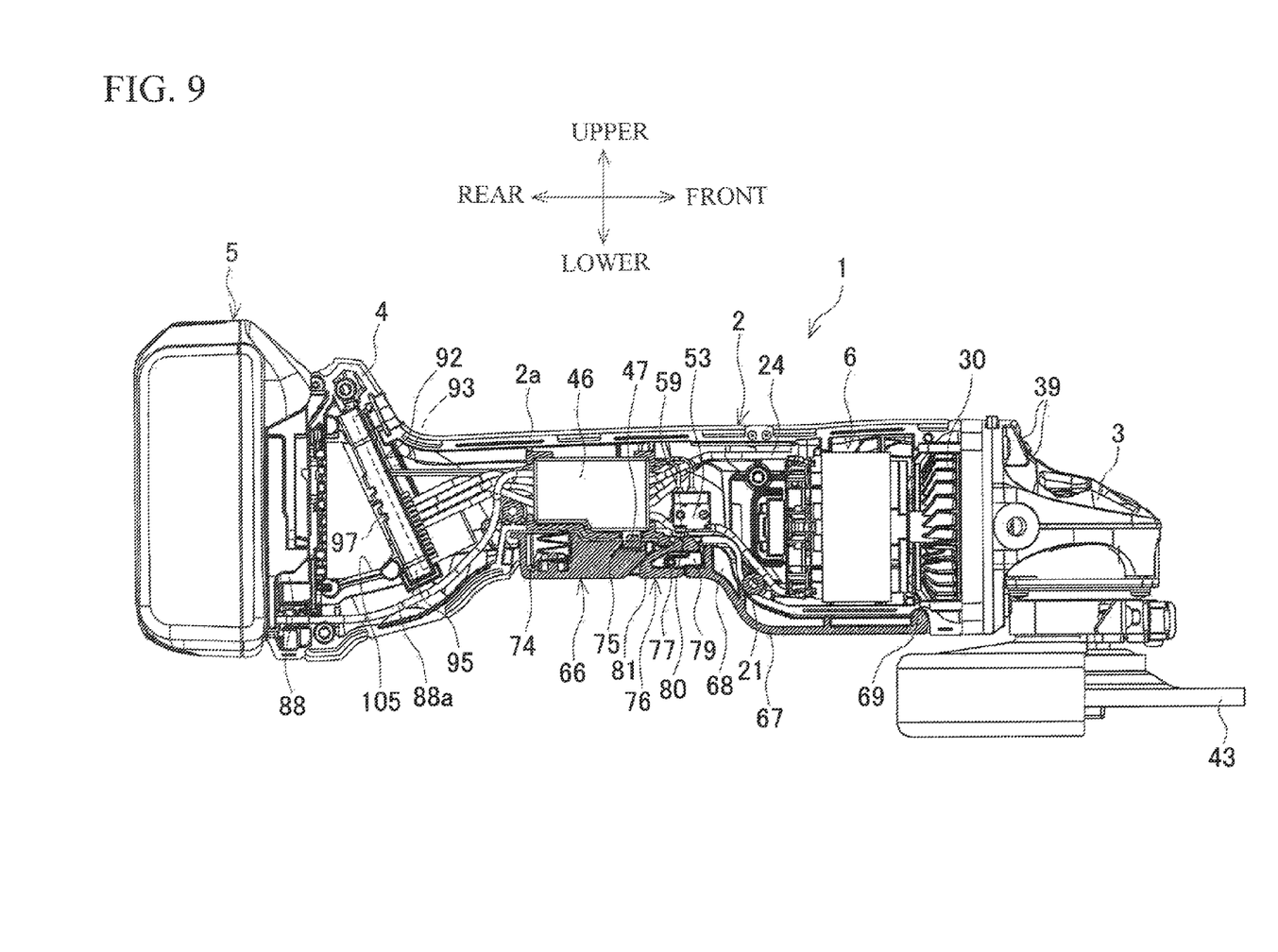

When the switch lever 66 is pushed further inward, the projection 80 of the locking portion 79 of the lock off lever 76 presses the button portion 59 of the micro switch 53, and the micro switch 53 is turned ON as illustrated in FIG. 9. Then, the circuit board 93 which receives the ON signal of the micro switch 53 supplies power source of the battery pack 5 to the brushless motor 6 to drive the brushless motor 6. In other words, the microcomputer of the circuit board 93 obtains a rotation detection signal which indicates the positions of the permanent magnets 20 of the rotor 12 output from rotation detection elements of the sensor circuit substrate 17 to acquire the state of rotation of the rotor 12. ON and OFF of the respective FETs are controlled in accordance with the obtained state of rotation, and a current to the respective coils 16 of the stator 11 is flowed in sequence to rotate the rotor 12. Therefore, since the rotary shaft 26 rotates and hence the spindle 7 is rotated via the bevel gears 37 and 38, a grinding operation with a distal end tool 43 is enabled.

Since the front stopper 33 and the rear stopper 34 are provided in the front and the rear of the rotating rotor 12 in this case, the permanent magnets 20 are restricted from moving in the fore-and-aft direction, and are prevented from coming apart from the rotor core 27. Therefore, the permanent magnets 20 are prevented from dropping off and the brushless motor 6 with high degree of reliability may be provided.

While the grinder 1 is used, the remaining amount of battery is notified by the display unit 102 with lighting of the LEDs. The inclined posture of the controller 92 provides good visibility of the display unit 102. With the controller 92 in the inclined posture in this manner, since the battery pack 5 is mounted in an orthogonal posture with respect to the main body housing 2, the grinder 1 may be installed vertically (in self-standing position) with the battery pack 5 positioned at the bottom. In addition, the entire length of the grinder 1 does not increase.

When the centrifugal fan 30 rotates in association with the rotation of the rotary shaft 26, outside air is sucked from the rear air intake ports 105 and 105. The outside air reaches the space 99 through the back surface of the case 95 of the controller 92, and proceeds around the controller 92 from below and goes forward in the main body housing 2. Then, the air passes through the main switch 46 and the micro switch 53, passes between the stator 11 and the rotor 12 of the brushless motor 6, reaches from the main body housing 2 to the gear housing 3, and exhausted from the exhaust port 39 to the outside. With this air flow, the controller 92 and the terminal base 88 are cooled, and the brushless motor 6 is also cooled. In particular, in the controller 92, the depressed and projected shape is formed by the groove 97 provided on the back surface of the case 95, and a contact surface area with the air is increased, so that the controller 92 is efficiently cooled.

Then, when the pushing in of the switch lever 66 is released, the switch lever 66 is pivoted downward by the biasing force of the coil spring 74, and is restored to the projecting position. With this operation, since the micro switch 53 and the main switch 46 are turned OFF in sequence, driving of the brushless motor 6 is stopped. When the finger is released from the lock off lever 76 at the projecting position, the lock off lever 76 is restored to the vertical posture by being biased by the torsion spring 78, and the locking portion 79 is brought into proximity to the bottom surface of the recess 51 again to maintain the lock-off state.

Even though the rear end of the switch lever 66 is deflected to the push-in side by an external force at the projecting position, and hence the press plate 75 pushes the plunger 47 of the main switch 46 to turn the main switch 46 ON, the micro switch 53 is not turned ON and hence the brushless motor 6 is not driven. Specifically, in this case, the lock off lever 76 as a supporting point is located rearward of the micro switch 53 (the micro switch 53 is arranged between the supporting point 69 and the lock off lever 76). Accordingly, if the rear end of the switch lever 66 is pushed in, the portion located on the front side of the lock off lever 76 is deflected toward a side opposite to the side being pushed in. Thus, there is no risk of accidental ON operation of the micro switch 53. Since the rigidity of the front portion of the lock off lever 76 of the switch lever 66 is high, even though an external force is applied directly to the corresponding portion, the deflection toward the push-in side is small. Thus, there is no risk of accidental ON operation of the micro switch 53. When the lock off lever 76 drops from the switch lever 66, only the main switch 46 is turned ON even though the switch lever 66 is pushed in, so that the brushless motor 6 is not driven in this case as well.

In this manner, according to the grinder 1 of the embodiment described above, if the lock off lever 76 as the switch operating portion is not moved to a position where the micro switch 53 can be operated, the micro switch 53 is not turned ON. Therefore, the risk of erroneous operation due to the deflection of the switch lever 66 or the like is avoided without providing the reinforcing member. In particular, since the lock off lever 76 provided on the switch lever 66 is used for turning the micro switch 53 ON, a rational configuration using the existing structure is used, so that an increase in costs is restrained.

In the same manner, with a configuration in which the micro switch 53 is arranged between the supporting point 69 of the switch lever 66 and the lock off lever 76, the risk of erroneous operation due to the deflection of the switch lever 66 or the like is eliminated.

The power is not distributed to the brushless motor 6 unless two switches, namely, the main switch 46 as the mechanical contact point and the micro switch 53 as an electric contact point are turned ON with the switch lever 66. Therefore, it is effective for preventing the erroneous operation as a matter of course and, in addition, the compact main switch 46 can be employed to achieve the thin tube portion 10 having a small diameter. Since the switches having a water-proof property can be used, water-proof property of the tool itself may be improved.

In the embodiment described above, the lock off lever is configured to turn the micro switch ON. However, the lock off lever may be configured to turn the main switch ON. In this case, the switch lever is provided with a pressing portion configured to turn the micro switch ON after the main switch is turned ON by the lock off lever.

The main switch and the micro switch are not limited to be formed separately, and may be formed into an integrated configuration having a water-proof property. In the case of the integrated configuration, further space saving and a compact profile are achieved.

In addition, the shape of the lock off lever may be changed as needed. However, the switch operating portion is not limited to the lock-off lever, and a specific operating portion configured to turn either one of the main switch or the micro switch ON may be provided integrally with or separately from the switch lever. The switch lever may be modified as needed such as forming into a straight shape depending on the shape of the housing.

Further, although only the controller is inclined in the embodiment described above, it is also possible to incline the terminal base as well in the same manner and incline the battery pack with respect to an axial line of the main body housing. In this case, the air intake ports formed between the controller and the terminal base parallel to each other are formed to have the same length in the fore-and-aft direction from the top to the bottom.

The air intake ports are not limited to be provided on both the left and right sides of the battery mounting portion, but may be provided only one side.

The invention is not limited to the grinder, and may be an AC tool which does not use a battery as the power source as long as the operating member configured to turn the switch ON is provided. For example, it is applicable to other electric tools such as a joint cutter, a nippler, a straight shear, a die grinder, a trimmer, a board cutter, an angle drill.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric tool comprising;
a motor;
a housing configured to accommodate the motor;
a switch configured to distribute power to the motor; and
an operating member configured to move with respect to the switch, wherein
the operating member is provided with a switch operating portion capable of operating the switch in association with a movement of the operating member toward the switch so as to be movable between a position where the switch can be operated and a position where the switch cannot be operated, wherein the switch operating portion is provided with a projection configured to contact and operate the switch by the movement of the operating member at a lock release position at one side end of the projection.

2. The electric tool according to claim 1, wherein the switch operating portion is a lock-off member located in a lock position where the movement of the operating member is restricted in a normal state, and is movable to the lock release position where the restriction of movement of the operating member is released, and the lock position corresponds to a position where the switch cannot be operated and the lock release position corresponds to a position where the switch can be operated.

3. The electric tool according to claim 2, wherein the lock-off member is rotatably attached to the operating member by a supporting pin, and in the lock position, takes a rotating posture in which one end side is in proximity to the housing side to restrict the movement of the operating member, and the other end side penetrates through the operating member and projects therefrom, and in the lock release position, the one end side moves away from the housing side by the operation of the other end side, whereby the movement restriction of the operating member is released.

4. The electric tool according to claim 3, wherein the lock-off member is rotationally biased to the lock position by a torsion spring.

5. The electric tool according to claim 3, wherein the lock-off member is provided with a projection capable of operating the switch by the movement of the operating member at the lock release position at one end side thereof.

6. The electric tool according to claim 2, wherein the operating member is pivotably coupled by a supporting point provided at one end which is retained by the housing, and the switch becomes operable by a push-in operation toward the housing.

7. An electric tool comprising:
a motor;
a housing configured to accommodate the motor;
a switch configured to distribute power to the motor; and
an operating member being configured to pivot about a pivotal movement supporting point coupled to the housing; and
a lock-off member provided so as to be movable toward the operating member,
wherein:
the switch is arranged between the pivotal movement supporting point and the lock-off member; and
the lock-off member is provided with a projection configured to contact and operate the switch by the movement of the operating member at a lock release position at one side end of the projection.

8. The electric tool according to claim 7, wherein the lock-off member is located in a lock position where the movement of the operating member is restricted in a normal state, and is movable to the lock release position where the restriction of movement of the operating member is released, and the lock position corresponds to a position where the switch cannot be operated and the lock release position corresponds to a position where the switch can be operated.

9. The electric tool according to claim 8, wherein the lock-off member is rotatably attached to the operating member by a supporting pin, and in the lock position, takes a rotating posture in which one end side is in proximity to the housing side to restrict the movement of the operating member, and the other end side penetrates through the operating member and projects therefrom, and in the lock release position, the one end side moves away from the housing side by the operation of the other end side, whereby the movement restriction of the operating member is released.

10. The electric tool according to claim 9, wherein the lock-off member is rotationally biased to a lock position by the torsion spring.

11. An electric tool comprising:
a motor;
a housing configured to accommodate the motor;
a first switch and a second switch accommodated in the housing and configured to distribute power to the motor; and
an operating member configured to operate the first switch and the second switch, and includes a switch lever, wherein the switch lever is configured to operate the first switch and not the second switch.

12. The electric tool according to claim 11, wherein the operating member includes a lock-off member located at a lock position in which the movement of the operating member is restricted in a normal state, and is capable of moving to a lock release position where the restriction of movement of the operating member is released, and the lock-off member is configured to operate the second switch at the lock release position.

13. The electric tool according to claim 12, wherein the lock-off member is rotatably attached to the operating member by a supporting pin, and in the lock position, takes a rotating posture in which one end side is in proximity to the housing side to restrict the movement of the operating member, and the other end side penetrates through the operating member and projects therefrom, and in the lock release position, the one end side moves away from the housing side by the operation of the other end side, whereby the movement restriction of the operating member is released.

14. The electric tool according to claim 13, wherein the lock-off member is rotationally biased to the lock position by a torsion spring.

15. The electric tool according to claim 13, wherein the lock-off member is provided with a projection configured to operate the second switch by the movement of the operating member at the lock release position at one end side thereof.

16. The electric tool according to claim 12, wherein the operating member is pivotably coupled by a supporting point provided at one end being retained by the housing, and the first switch becomes operable by a push-in operation toward the housing.

* * * * *